US006954999B1

(12) United States Patent
Richardson et al.

(10) Patent No.: US 6,954,999 B1
(45) Date of Patent: Oct. 18, 2005

(54) TRENCHER GUIDANCE VIA GPS

(75) Inventors: Christopher D. Richardson, Peoria, IL (US); Vincent Lansing Lasher, West Milton, OH (US); Robert Marvin Beekman, Oxford, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 11/010,467

(22) Filed: Dec. 13, 2004

(51) Int. Cl.[7] ............................ E02F 5/02; G05D 1/02; G05D 1/04

(52) U.S. Cl. ........................................... 37/348; 701/50

(58) Field of Search ................................ 037/348, 347, 037/352–362, 382, 414–416, 907, 234, 308–312; 701/50; 414/222.02, 265, 270, 307, 323, 414/148

(56) References Cited

U.S. PATENT DOCUMENTS

| | | | |
|---|---|---|---|
| 5,553,407 | A | 9/1996 | Stump |
| 6,112,145 | A | 8/2000 | Zachman |
| 6,269,885 | B1 | 8/2001 | Barber et al. |

*Primary Examiner*—Christopher J. Novosad
(74) *Attorney, Agent, or Firm*—Dinsmore & Shohl LLP

(57) ABSTRACT

A guidance control system is configured to control the positioning and spatial orientation of a digging implement mounted on a frame of an trenching machine for working a subsurface of earth to a desired trench profile. The position of a dynamic cutting edge of the digging implement is monitored and then controlled so that the sensed dynamic cutting edge position is equal substantially to the calculated dynamic cutting edge position. The guidance control system includes sensors, a processor, and accessible memory providing digital design information regarding the desired trench profile.

42 Claims, 3 Drawing Sheets

TRENCHER GUIDANCE VIA GPS

BACKGROUND OF THE INVENTION

The present invention relates generally to control systems for controlling an implement carried by a machine, and more particularly, to a method and apparatus for controlling a digging implement of a trenching machine while trenching a subsurface of earth.

Trenching machines for trenching the subsurface of earth at a construction site typically include a drive unit mounting some form of a trenching or digging implement, such as a digging chain or rock wheel. When preparing the subsurface of earth for, for example, a drain, a sewer, utility pipes, a cableway and the like, it is typically desirable for the contour or grade of the subsurface shaped by the digging implement to approximate a desired finished surface as closely as possible. How accurately the subsurface of earth is shaped depends upon both how accurately the position of a cutting edge of the digging implement can be determined and maintained, and how accurately the direction of travel of the digging implement can be determined.

A number of prior art systems control the positioning of a tool carried by a machine, including the digging implement of a trencher. For example, conventional control systems use a laser as a reference for positioning the digging implement in a trench. In order to position accurately the digging implement, a laser receiver needs to be mounted directly over the cutting edge of the digging implement. However, the location of the cutting edge of the digging implement is changing constantly during trenching operations. As the pitch of the digging implement changes with digging depth, the mast angle of the laser receiver mounted above the cutting edge is changing similarly, thereby causing inaccurate measurements of the position of the cutting edge of the digging implement. A prior art solution to this problem has been to readjust manually the mast mounting the laser receiver to a vertical position as the pitch of the digging implement changes in order to maintain accuracy during operation. It is to be appreciated that the above mentioned prior art solution is labor intensive, and causes delays in trenching operations as the digging implement must be stop in order for a technician to readjust the mast each time the pitch of the digging implement changes.

SUMMARY OF THE INVENTION

It is against the above background that the present invention provides a number of advantages and advances over the prior art. In particular, the present invention provides a guidance control system and method for controlling the positioning of a cutting edge of a digging implement working a subsurface of earth to a desired shape.

According to a first aspect of the present invention, a method for regulating positioning and orientation of a dynamic cutting edge of a digging implement mounted to a frame of a trenching machine and adjustably moveable by an actuating mechanism in order to control working of a subsurface of earth to a desired trench profile is disclosed. The method comprises obtaining a current location of the trenching machine via at least one global navigation system receiver; obtaining a current measurement of the digging implement via a first sensor; obtaining a current spatial orientation of the trenching machine from a second sensor; and combining the current location of the trenching machine, the current spatial orientation of the trenching machine, and the current measurement of the digging implement with known machine dimensions and calibration information to provide a current position of the cutting edge. The method further comprises comparing the current position of the cutting edge with digital design information to determine a positional difference between the current position of the cutting edge and a desired position of the cutting edge as indicated by the digital design information for a given position along the desired trench profile; and adjusting at least the positioning of the dynamic cutting edge of the digging implement if the positional difference is greater than a predetermined degree of error such that the subsurface worked by the digging implement approximates, as closely as possible, the desired trench profile.

According to a second aspect of the present invention, a guidance control system for controlling the positioning of a cutting edge of a digging implement mounted to a frame of a trenching machine and adjustably moveable by an actuating mechanism in order to control the working of a subsurface of earth to a desired trench profile is disclosed. The guidance control system comprises a first sensor adapted to generate a first signal indicative of pitch of the digging implement relative to the frame of the trenching machine; a second sensor adapted to generate a second signal indicative of a spatial orientation of the trenching machine relative to earth; and at least one global navigational system receiver adapted to generate a third signal indicative of a global position of the trenching machine. The guidance control system further comprises a processor electrically coupled to the actuating mechanism and the sensor system and programmed to control the positioning of the cutting edge of the digging implement by controlling the activation of the actuating mechanism in response to at least the first signal from the first sensor, at least the second signal from the second sensor, and at least the third signal from the at least one global navigational system receiver.

Other features and advantages of the present invention will become apparent upon consideration of the present specification and the appended drawings.

DETAILED DESCRIPTION

Although the present invention is herein described in terms of the illustrated embodiment, it will be readily apparent to those skilled in the art that various modifications, re-arrangements, and substitutions can be made without departing from the spirit of the invention. The present control system is described particularly herein with regard to working a subsurface of earth with a trencher, for example, to a desired shape and grade. However, this is for exemplary purposes only, and the present invention is not intended to be so limited. The present control system may be used in any suitable trenching machine or method to manually or automatically control the positioning of a cutting edge of its digging implement.

Figure 1:
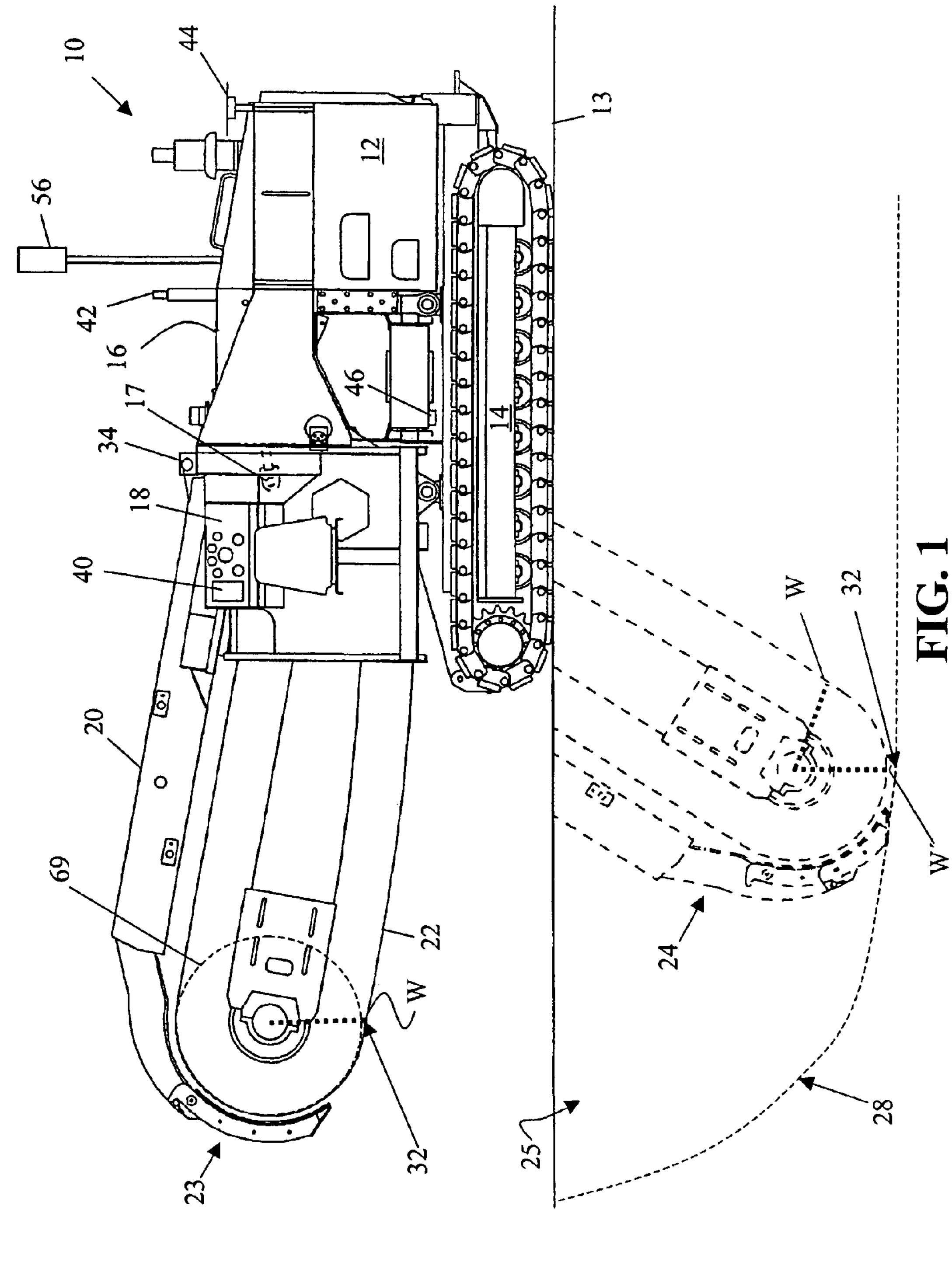
FIG. 1 is an isometric view of a track trencher into which the present invention is incorporated.

Referring now to the figures, and more particularly to FIG. 1, there is shown an illustration of one embodiment of a track trencher 10 well-suited for incorporating a novel guidance control system according to the present invention. The track trencher 10 typically includes an engine 12 and moves along the ground 13 on a pair of tracks, which are on each side of the track trencher 10 with left track 14 being visible in FIG. 1. The engine 12 is coupled to the pair of tracks 14, which together comprise the drive unit 16 of the track trencher 10. Control of the propulsion and steering of the track trencher 10 is through a main user interface 18 of the track trencher 10 as is the practice.

An excavation boom 20 is pivotally mounted to a frame 17 of the drive unit 16 which provides a boom mount pivot axis to allow control of the excavation depth. A digging implement 22 is rotatably coupled to the boom 20 and driven by the drive unit 16, and typically performs a specific type of excavating operation.

The digging implement 22, such a digging chain, rock wheel or other excavation attachment, is often employed to dig (or fill) trenches of varying width and depth at an appreciable rate. In the illustrated embodiment, the digging implement 22 is a digging chain; however, a rock wheel may be controlled in a manner similar to that of the digging chain. The digging implement 22 generally remains above the ground 13 in a transport configuration 23 when maneuvering the track trencher 10 around the excavation site. During excavation, the digging implement 22 is lowered via the boom 20, penetrates the ground 13, and excavates a trench 25 to a desired depth while in a trenching configuration 24.

Figure 2:
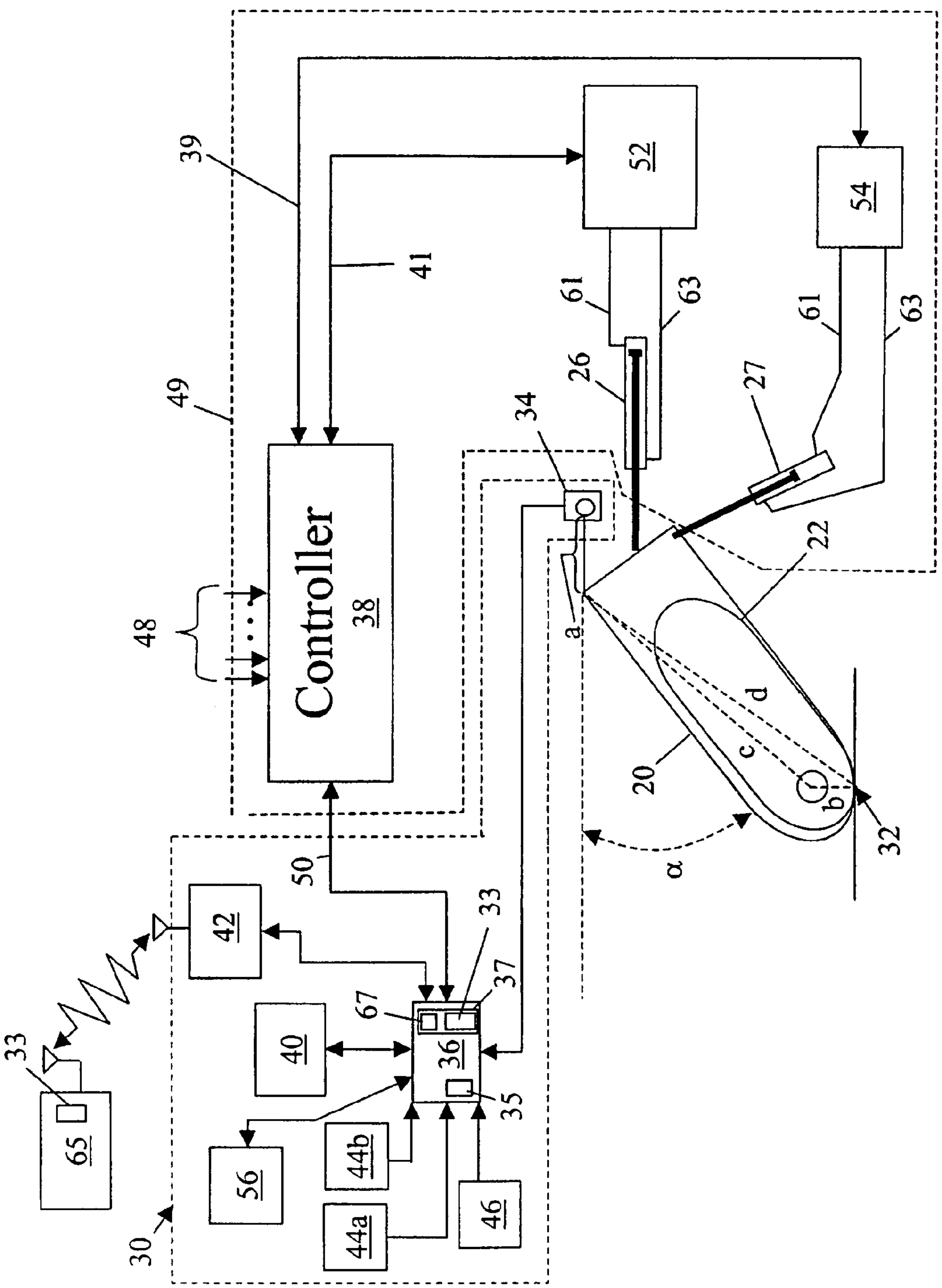
FIG. 2 is a schematic representation of a guidance control system for regulating the positioning and orientation of a digging implement on a track trencher according to the present invention.

With reference made also to FIG. 2, as shown the digging implement 22 can be raised and lowered by at least one hydraulic actuator or ram 26 that is attached between to the drive unit 16 and boom 20. An additional hydraulic actuator or ram 27 is provided to tilt the digging implement 22 and/or boom 20 about a vertical axis relative to the drive unit 16. A further actuator (not shown), either mechanical or hydraulic, may be provided to pivot horizontally the boom 20 relative to the drive unit 16 as is standard practice. Still more hydraulic actuators or rams (not shown) may be provided to supply additional excavation force to the digging implement 22.

When the track trencher 10 is to move earth, the digging implement 22 is lowered to the surface of the ground 13 and at that time, the digging implement pushed earth aside producing the relatively smooth surface trench 25. The digging implement 22 is lowered controllably to a desired depth, optionally moved side-to-side to produce a desired trench width, and pulled via forward motion of the pair of tracks 14. It is to be appreciated that a guidance control system 30 (FIG. 2) of the present invention controls the positioning of a dynamic cutting edge 32 of the digging implement 22 such that it may precisely follow digital design information 33 for a desired trench profile 28 that has been entered into the guidance control system 30. It is to be appreciated that the dynamic cutting edge 32 represents the deepest cutting point (grade point) of the digging implement 22.

As the track trencher 10 continues to travel over the ground 13 of the worksite, which may be an undulating and rough surface, or as the depth of the digging implement 22 changes according to the digital design information 33 for the desire trench profile 28, pivot angle α (i.e., pitch of the boom 20) changes with surface and depth variations. As pivot angle α changes so does the relationship of the dynamic cutting edge 32 of the digging implement 22 to the earth which produces deviations in the resulting trench 25 from the desired trench profile 28 if not monitored and controlled. In other words, as the boom 20 is raised or lowered, intentionally or not, the position of the dynamic cutting edge 32 moves, such as, for example, from point W to point W' on the digging implement 22 as illustrated in FIG. 1.

The track trencher 10 includes the guidance control system (GCS) 30 that compensates for the positional changes in the track trencher 10 with respect to the earth, the depth of the digging implement 22, and the resultant positional changes in the dynamic cutting edge 32. The GCS 30 has a first sensor 34 mounted to the drive unit 16 and connected to the digging implement 22 to detect displacement of the digging implement 22 with respect to drive unit 16. In one embodiment, the first sensor 34 is a linear encoder (e.g., a cable encoder) connected to measure the linear displacement between a point on the boom 20 and/or the digging implement 22, and a point on the drive unit 16 as the digging implement is lowered and raised relative to the drive unit by the boom 20. In another embodiment, the first sensor 34 can be a potentiometer with its wiper mechanically connected to move as the digging implement 22 and boom 20 pivots about the pivot mounting to the drive unit 16, in which the resistance of the potentiometer varies as a function of the pivot angle α of the digging implement 22 and the boom 20. The first sensor 34 is electrically connected to inputs of a computer 36.

The computer 36 includes a processor 35 and accessible memory 37 for storing and executing a control program to implement the present invention. The control program is generally illustrated as symbol 300 in FIG. 3, which is discussed in greater detail in a later section hereafter. The computer 36 includes appropriate input and output ports to communicate with a number of other sub-systems that acquire various types of data, process such data, and interface with a machine controller 38 of the track trencher 10 to monitor and optimize the excavation process. A control system user interface 40 is preferably situated in proximity to an operator seat 41 mounted to the track trencher 10 as is illustrated by FIG. 1, and provides a means for communicating with the computer 36. The machine controller 38 communicates with the computer 36 and is responsive to operator inputs received from the control system user interface 40 to cooperatively control the operation of the digging implement 22 and boom 20.

The movement and direction of the track trencher 10 is monitored and, if desired, automatically controlled by the computer 36. Such functionality is provided by the GCS 30 further including a data transceiver 42 mounted to the track trencher 10 and one or more global navigation system (GNS) receivers, such as indicated by symbol 44 in FIG. 1, and symbols **44*a* and 44*b* in FIG. 2, which interface with the computer 36. Signals from a plurality of global navigation satellites orbiting overhead, such as GPS, GLONASS, GALILEO, and combinations thereof, are received by each GNS receiver 44 so that the geographic position data, such as latitude, longitude, elevation data, and displacement (heading) data from one or more reference locations, of the dynamic cutting edge 32 can be determined to a centimeter level of accuracy by the computer 36**.

In one embodiment, the use of two laterally spaced antennas of the pair of GNS receivers **44*a* and 44*b* mounted on the track trencher 10 permit the computer 36 to monitor the position, the heading, and the roll of the drive unit 16. A second sensor 46, also electrically connected to the computer 36, is mounted to the drive unit 16 to provide to the computer 36 the spatial orientation of the track trench 10** relative to earth. In one embodiment, the second sensor 46 monitors at least the pitch of the drive unit 16 of the track trencher 10. In another embodiment, the second sensor 46 in addition to pitch, also monitors roll of the drive unit 16. In one specific embodiment, the second sensor 46 is an inclinometer, and in other embodiments, may be any suitable gravity-based sensor for detecting changes in pitch and, if desired, roll, such as a slope sensor, an accelerometer, or a pendulum sensor. It is to be appreciated that the information provided by the GNS receivers 44*a* and 44*b* and the second sensor 46 to the computer 36, enables the computer 36 to track the location of the track trencher 10 at the worksite, and provide further compensations to the orientation and positioning of the digging implement 22, and hence the dynamic cutting edge 32, based on the heading, location, and the degree of pitch and roll of the drive unit 16 while moving.

A series of inputs 48 are provided from controls of the track trencher 10, such as provided on main user interface 18, which enable the operator to manually operate an actuating mechanism 49 that positions and operates the digging implement 22. A control line 50 from the computer 36 to the machine controller 38 activates and deactivates solenoid operated hydraulic control valve assemblies 52 and 54 of the actuating mechanism 49, as will be discussed in greater detail with reference to FIG. 3.

The controller 38 of the actuating mechanism 49 provides respective outputs 39 and 41 which are coupled to first and second control valve assemblies 52 and 54, respectively. The two control valve assemblies 52 and 54 can be of any of several commercially available types. Each control valve assembly 52 and 54 has a pair of work ports 61 and 63 connected to the upper and lower chambers of the respective rams 26 and 27 in order to extend or retract the respective ram. In one embodiment, a pair of solenoids (not shown) on each of the control valve assemblies 52 and 54 are electrically operated by compensation signals from the controller 38, via outputs 39 and 41.

With each control valve assembly 52 or 54, activation of one of the solenoids applies hydraulic fluid from a pump (not shown) to a first cylinder chambers and drains the hydraulic fluid from a second cylinder chamber to a tank, thereby extending a respective piston. Activation of the other solenoid for the control valve 52 or 54 applies hydraulic fluid from the pump to the second cylinder chamber, and drains the hydraulic fluid from the first cylinder chamber, thereby retracting the respective piston. Thus, by selectively actuating one of the respective solenoids, ram 26 can raise or lower the digging implement 22 and boom 20, and cylinder 27 can tilt the digging implement 22 about a vertical axis. It will appreciated by one skilled in the art that each of the control valve assemblies 52 and 54 may be independently controlled manually by the track trencher operator via inputs 48.

Once the digital design information 33 for the predetermined desired trench profile 28 has been entered into the computer 36, either via data transceiver 42 electronically receiving the digital design information transmitted from a remote system 65, or entered manually via the control system user interface 40, the operator commands the computer 36 to execute the control program 300. It is to be appreciated that updates on the position of the track trencher 10 and the digital design information 33 for the desire trench profile 28 may also be provided to the computer 36 via the data transceiver 42. The control program 300, through the computer 36, produces an adjustment signal on control line 50 which causes the controller 38 to make adjustments to the position and orientation of cutting edge 32 of the digging implement 22 to follow the digital design information 33 for the desired trench profile 28. Locating the digging implement 22 at a surveyed start position ensures that the track trencher 10 and the resulting trench 25 will be located properly and closely approximate the desired trench profile 28, such that during trenching operations no further external measurements on the position and depth of the dynamic cutting edge 32 is needed.

When using the guidance control system 30, the computer 36 responds to the signal from the first sensor 34, which indicates rotational movement or pitch of the digging implement 22 and boom 20 relative to the drive unit 16. The computer 36 processes the electrical signal from the first sensor 34, and in one embodiment, uses a lookup-table 67 stored in memory to determine the coordinate position (x, y, z) of the dynamic cutting edge 32 relative to a known position on the drive unit 16 as the digging implement 22 and boom 20 lowers into the ground 13. It is to be appreciated that the lookup-table 67 is a predetermined linear relationship between the height of the boom 20 and the and the position of the dynamic cutting edge 32. In one embodiment, the lookup-table 67 was determined by mapping the movement of the boom 20 while mapping the corresponding position of the cutting edge 32 around the radius of the digging implement 22 as the boom lowers and raises.

In another embodiment, the computer 36 can derive the position of the dynamic cutting edge 32 using the signal from the first sensor 32 as an indication of angular displacement. Specifically, when automatic control is enabled, the computer 36 stores the signal level from the first sensor 34 as a home or reference pivot location of the digging implement 22. In response, the controller computes the angle $\alpha$ from the sensor's electrical signal. The value of $\alpha$ is then used to derive the change in position of the dynamic cutting edge 32 caused by the lowering or raising the digging implement 22 and boom 20.

In another embodiment, the computer stores the positional signals from the GNS receivers 44*a* and 44*b* as a home or reference coordinate location. Thereafter, feedback of the position of the dynamic cutting edge 32 of the digging implement 22 is provided to the computer 36 via the first sensor 32. An absolute position of the dynamic cutting edge 32 is thus established by the computer 36 in response to the signals from the GNS receivers 44*a* and 44*b*. The computer 36 also interprets changes in the height between the GNS receivers 44*a* and 44*b* as indicating tilting of the track trencher 12 with respect to earth. The second sensor 46 provides the actual pitch of the machine to the computer 36.

The computer 36 then uses the signals provided by the sensors 34 and 46, and GNS receivers 44*a* and 44*b*, to command controller 38 how to operate rams 26 and 27 in order for the cutting edge 32 of the digging implement 22 to follow the digital design information 33 for the desired trench profile 28 and to compensate for the movement of the track trencher 10 produced by the track trencher 10 pitching and tilting with respect to the ground 13.

In still another embodiment, the location of the track trencher 10 is also provided by an external laser control system (not shown). The laser control system includes a laser transmitter (not shown) which transmits a rotating beam of laser light which defines a reference plane. The laser transmitter is positioned at a known location on the worksite. A laser detector 56 is positioned on the drive unit 16 of the track trencher 10. The laser beam from the laser transmitter sweeps across the laser detector 56. A signal is transmitted from the laser detector 56 to the computer 36 indicating a relative position of the laser beam on the detector. The computer 36 is programmed to determine the relative position and elevation of the track trencher 10 based on the signal from the laser detector, and thus, the relative vertical position of the digging implement 22 relative to the surface of the earth being worked by the digging implement. Accordingly, the dynamic cutting edge 32 is properly positioned at the desired elevation on the work site.

The desired path of the track trencher 10 may also be programmed into the computer 36, as part of the digital design information 33. The GCS 30 also monitors the actual path of the track trencher 10 while the computer 36 determines whether the track trencher 10 has deviated from the desired path. Accordingly, the computer 36 can be used to also give steering inputs to the controller 38 to maintain the desired path provided in the digital design information 33, thereby eliminating the need for a second guidance system.

Figure 3:
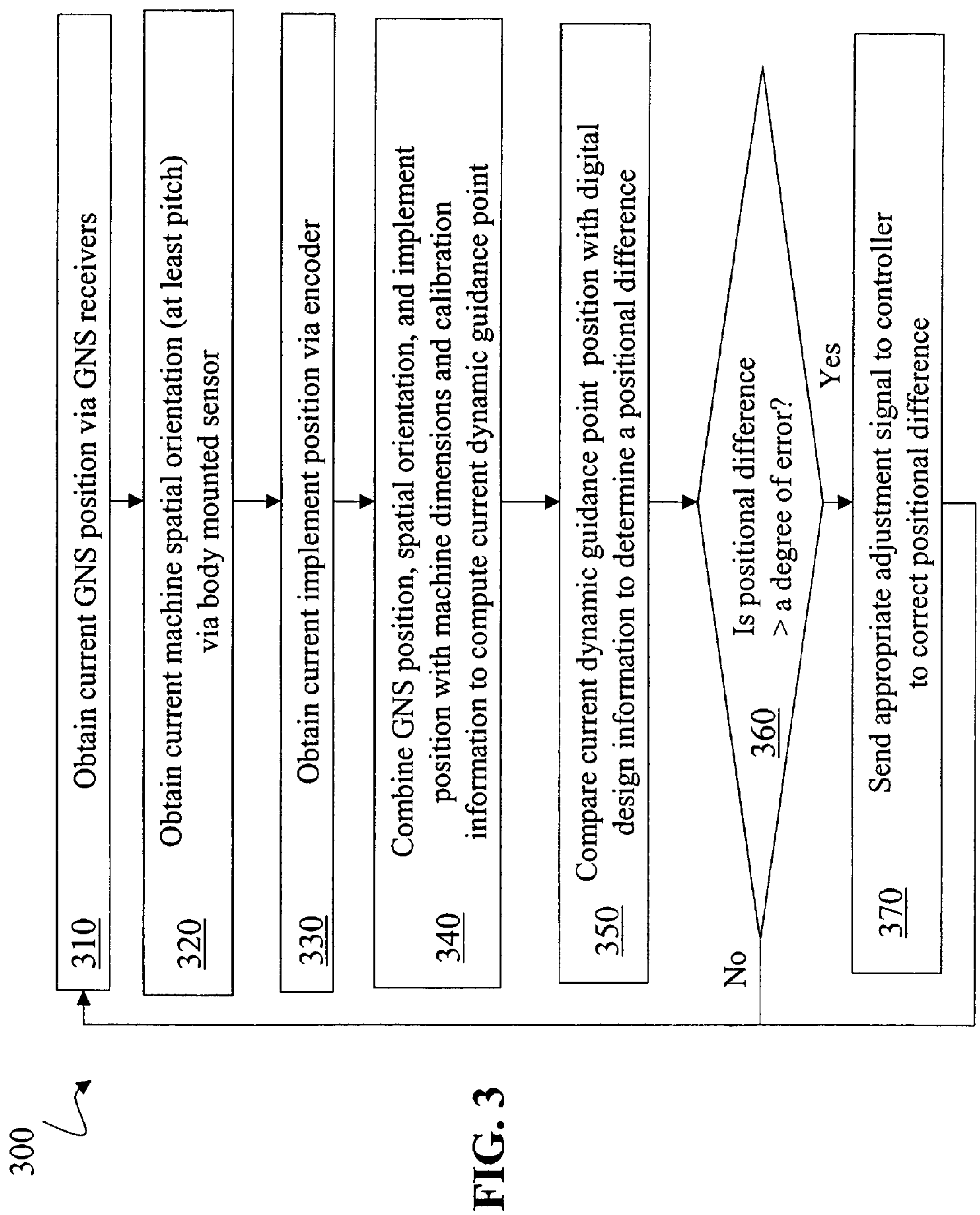
FIG. 3 is a schematic block diagram of a guidance control system program for regulating the positioning and orientation of a digging implement on a track trencher according to the present invention.

FIG. 3 is a schematic block diagram of the guidance control system program 300 for regulating the positioning and orientation of the dynamic cutting edge 32 of the digging implement 20 according to the present invention. In step 310, the guidance control system 30 is programmed to obtain the current position (location) and heading via GNS receivers 44*a* and 44*b*. In step 320, the guidance control system 30 is programmed to obtain the current machine spatial orientation from the second sensor 46. In one embodiment, the spatial orientation is at least the pitch of the track trencher 10 relative to earth. In other embodiments, the spatial orientation is pitch and roll relative to earth. It is, however, to be appreciate that the computer 36 may be programmed in one embodiment to determine either pitch or roll, or both from the differences in the coordinate positions provided by the GNS receivers 44*a* and 44*b*, should an input for sensor 46 be unavailable.

Next in step 330, the computer 36 obtains a current measurement of the boom 20 via the first sensor 34 (measurement "a" in FIG. 2). As illustrated in the embodiment shown by FIG. 2, measurement "a" is the linear travel of the boom 20 relative to the drive unit of the track trencher 10. The computer 36 then combines the current position and heading, the current spatial orientation of the track trencher 10, and the current measurement of the digging implement with known machine dimensions and calibration information to provide a current position of the cutting edge 32 in step 340. In one embodiment, the current position of the cutting edge 32 is provided with three coordinate dimensions (X, Y, and Z) or (North, East, Elevation), and in other embodiments may be longitude, latitude, and elevation.

It is to be appreciated that the calibration information is determined at the time of the installation of the guidance control system 30 to the track trencher 10, and includes such information as the radius or diameter 69 (FIG. 1) of the digging implement 22 at the end of the boom 20 (measurement "b" in FIG. 2), the distance from a center of the axis around which the digging implement 22 rotates at the end of the boom to the encoder connection point to the boom (measurement "c" in FIG. 2), and the mounting locations of the second and third sensors and GNS receivers relative to a position on the track trencher, such as the mounting location of the first sensor 34 of the track trencher.

In one embodiment, to provide the current position of the cutting edge 32, the computer 36 takes measurement "a", provided by the first sensor 34, and then find a corresponding measurement "d" (FIG. 2) in the lookup-table 67 provided in the memory of the computer 36. It is to be appreciated, in such an embodiment, that values in the lookup-table 67 for each measurement "d" were pre-established by hand measuring "d" for each value of "a." In other embodiments, the computer may use an angular or vector relationship between measurement "a", "b" and "c" to calculate "d" as the boom 20 lowers or raises.

In step 350, the computer 36 compares the current position of the cutting edge 32 with the digital design information 33 stored in memory of the computer 36 to determine a positional difference between the current position of the cutting edge and a desired position of the cutting edge 32 as indicated by the digital design information for a given position along the desired path 28.

Once the positional difference is determined, in step 360 the computer 36 checks if the positional difference is greater that a predetermined acceptable degree of error. The degree of error is set to ensure that only adjustments due to pitch changes necessary to maintain the cutting edge 32 of the digging implement 22 on the desired trench profile 28, and not due to sensor noise, is sent as a control signal by the computer. Should the positional difference be greater than the degree of error, then in step 370, the computer 36 send an appropriate adjustment signal to controller 38, via control line 50, to compensate for the positional difference. The controller 38 uses the adjustment signal sent from the computer 36 to adjust the positioning of rams 26 and 27. In this manner, the contour or grade of the subsurface shaped by the digging implement approximates, as closely as possible, the desired trench profile 28.

It is to be appreciated, that the computer 36 may also provided a visual indication on the control system user interface 40 when the cutting edge 32 of the digging implement 22 is out of position, and also when in the desired position.

It is also to be appreciated that the use of a linear encoder 32, GNS receivers 44*a* and 44*b*, and spatial orientation sensor 46 located on the drive unit 16 provides for a guidance control system 30 that is not affected by the depth and angle of the boom 20. Another benefit is the location of the equipment of the system is more protected therefore decreasing the chance of down time.

Having described the invention in detail and by reference to preferred embodiments thereof, it will be apparent that modifications and variations are possible without departing from the scope of the invention defined in the appended claims.

What is claimed is:

1. A method for regulating positioning and orientation of a dynamic cutting edge of a digging implement mounted to a frame of a trenching machine and adjustably moveable by an actuating mechanism in order to control working of a subsurface of earth to a desired trench profile, said method comprising:

obtaining a current location of the trenching machine via at least one global navigation system receiver;

obtaining a current measurement of the digging implement via a first sensor;

obtaining a current spatial orientation of the trenching machine from a second sensor;

combining said current location of the trenching machine, said current spatial orientation of the trenching machine, and said current measurement of the digging implement with known machine dimensions and calibration information to provide a current position of the cutting edge;

comparing said current position of the cutting edge with digital design information to determine a positional difference between said current position of the cutting edge and a desired position of the cutting edge as indicated by said digital design information for a given position along the desired trench profile; and adjusting at least the positioning of the dynamic cutting edge of the digging implement if the positional difference is greater than a predetermined degree of error such that the subsurface worked by the digging implement approximates, as closely as possible, the desired trench profile.

2. The method of claim 1 further comprises sending an appropriate adjustment signal to a controller of the trenching machine for adjusting the positioning of the dynamic cutting edge of the digging implement if the positional difference is greater than the predetermined degree of error.

3. The method of claim 1 wherein said method is running as a guidance control system program enabling a processor to regulating the positioning and orientation of a dynamic cutting edge of a digging implement.

4. The method of claim 1 further comprises obtaining a current heading of the trenching machine via said at least one global navigation system receiver.

5. The method of claim 1 wherein said method is running as a guidance control system program enabling a processor to regulating the positioning and orientation of the dynamic cutting edge of the digging implement, and wherein said digital design information is provided in memory accessible by said processor.

6. The method of claim 1 wherein said spatial orientation is at least the pitch of the trenching machine relative to earth.

7. The method of claim 1 wherein said spatial orientation is pitch and roll of the trenching machine relative to earth.

8. The method of claim 1 wherein said at least one global navigation system receiver is a pair of global navigation system receivers, and said method further comprises determining at least roll from differences in coordinate positions provided by said pair of global navigation system receivers.

9. The method of claim 1 wherein said current measurement is linear travel of digging implement relative to a frame of the trenching machine.

10. The method of claim 1 wherein said current position of the cutting edge is provided with at least three coordinate dimensions.

11. The method of claim 1 wherein said current position of the cutting edge is provided with at least three coordinate dimension of the type selected from Cartesian (x, y, and z), ground surveying (North, East, Elevation), and geographical (longitude, latitude, and elevation).

12. The method of claim 1 wherein said calibration information includes a radius of the digging implement about a rotating axis, distance of a center of said rotating axis to said first sensor, and mounting locations of said first and second sensors and said at least one global navigation system receiver relative to a position on the trenching machine.

13. The method of claim 1 wherein the current position of the cutting edge is provided in part by finding a corresponding measurement in a lookup-table for the current measurement provided by the first sensor.

14. The method of claim 1 wherein the current position of the cutting edge is provided in part by using a relationship between a radius of the digging implement about a rotating axis, distance of a center of said rotating axis to said first sensor, and mounting locations of said first and second sensors and said at least one global navigation system receiver relative to a position on the trenching machine.

15. The method of claim 1 comprises sending an appropriate adjustment signal to a controller of the trenching machine for adjusting the positioning of the dynamic cutting edge of the digging implement if the positional difference is greater than the predetermined degree of error, wherein said controller uses said adjustment signal to adjust the positioning of at least one ram.

16. The method of claim 1 further comprises providing a first visual indication on a control system user interface when the cutting edge of the digging implement is out of position, and a second visual indication when the cutting edge of the digging implement is positioned according to the desire trench profile.

17. The method of claim 1 further comprises remotely receiving said digital design information.

18. The method of claim 1 wherein said method is running as a guidance control system program enabling a processor to regulating the positioning and orientation of the dynamic cutting edge of the digging implement, and wherein said digital design information is provided in memory accessible by said processor, and said method further comprises receiving said digital design information into said memory.

19. The method of claim 1 further comprises detecting a laser reference with a laser receiver mounted on the trenching machine, but not on the digging implement, to provide additional information regarding the location and elevation of the trenching machine.

20. A guidance control system for controlling the positioning of a cutting edge of a digging implement mounted to a frame of a trenching machine and adjustably moveable by an actuating mechanism in order to control the working of a subsurface of earth to a desired trench profile, said guidance control system comprising:

a first sensor adapted to generate a first signal indicative of pitch of the digging implement relative to the frame of the trenching machine;

a second sensor adapted to generate a second signal indicative of a spatial orientation of the trenching machine relative to earth;

at least one global navigational system receiver adapted to generate a third signal indicative of a global position of the trenching machine; and a processor electrically coupled to said actuating mechanism and said sensor system and programmed to control the positioning of said cutting edge of said digging implement by controlling the activation of said actuating mechanism in response to at least said first signal from said first sensor, at least said second signal from said second sensor, and at least said third signal from said at least one global navigational system receiver.

21. The control system of claim 20, wherein said first sensor comprises an encoder.

22. The control system of claim 20, wherein said first sensor comprises an encoder selected from the group consisting of a linear encoder and a resistive potentiometer.

23. The control system of claim 20, wherein said second sensor comprises a gravity-based sensor.

24. The control system of claim 20, wherein said second sensor is selected from the group consisting of a slope sensor, an inclinometer, an accelerometer, and a pendulum sensor.

25. The control system of claim 20, wherein said at least one global navigational system receiver comprises a pair of laterally spaced global navigational system receivers.

26. The control system of claim 20, wherein said at least one global navigational system receiver comprises a pair of laterally spaced global navigational system receivers, and said processor is adapted to determine at least roll from differences in coordinate positions provided by said pair of global navigation system receivers via said third signal.

27. The control system of claim 20, wherein said sensor system further comprises a third sensor mounted on the trenching machine but not the digging implement generating a fourth signal indicative of relative height of the trenching machine, and wherein said processor is programmed to control the positioning of said cutting edge of said digging implement by controlling the activation of the actuating mechanism in response to said first signal from said first sensor, said second signal from said second sensor, said third signal from said at least one global navigational system receiver, and said fourth signal from said third sensor.

28. The control system of claim 20, wherein the digging implement is a digging chain.

29. The control system of claim 20, wherein the trenching machine is a track trencher.

30. The control system of claim 20, wherein said guidance control system further comprises a data transceiver, said guidance control system being adapted to received digital information providing said desired trench profile via said data transceiver.

31. An trenching machine comprising:

a vehicle having a frame;

an digging implement coupled to said frame and adjustably moveable with respect to said frame by an actuating mechanism; and a guidance control system arranged to control a positioning and orientation of said digging implement in order to control the working of a subsurface of earth to a desired trench profile, said guidance control system comprising:

a first sensor adapted to generate a first signal indicative of pitch of the digging implement relative to the frame of the trenching machine;

a second sensor adapted to generate a second signal indicative of a spatial orientation of the trenching machine relative to earth;

at least one global navigational system receiver adapted to generate a third signal indicative of a global position of the trenching machine; and a processor electrically coupled to said actuating mechanism and said sensor system and programmed to control the positioning of said cutting edge of said digging implement by controlling the activation of said actuating mechanism in response to at least said first signal from said first sensor, at least said second signal from said second sensor, and at least said third signal from said at least one global navigational system receiver.

32. The trenching machine of claim 31, wherein said first sensor comprises an encoder.

33. The trenching machine of claim 31, wherein said first sensor comprises an encoder selected from the group consisting of a linear encoder and a resistive potentiometer.

34. The trenching machine of claim 31, wherein said second sensor comprises a gravity-based sensor.

35. The trenching machine of claim 31, wherein said second sensor is selected from the group consisting of a slope sensor, an inclinometer, an accelerometer, and a pendulum sensor.

36. The trenching machine of claim 31, wherein said at least one global navigational system receiver comprises a pair of laterally spaced global navigational system receivers.

37. The trenching machine of claim 31, wherein said at least one global navigational system receiver comprises a pair of laterally spaced global navigational system receivers, and said processor is adapted to determine at least roll from differences in coordinate positions provided by said pair of global navigation system receivers via said third signal.

38. The trenching machine of claim 31, wherein said sensor system further comprises a third sensor mounted on the trenching machine but not the digging implement generating a fourth signal indicative of relative height of the trenching machine, and wherein said processor is programmed to control the positioning of said cutting edge of said digging implement by controlling the activation of the actuating mechanism in response to said first signal from said first sensor, said second signal from said second sensor, said third signal from said at least one global navigational system receiver, and said fourth signal from said third sensor.

39. The trenching machine of claim 31, wherein the digging implement is a digging chain.

40. The trenching machine of claim 31, wherein the trenching machine is a track trencher.

41. The trenching machine of claim 31, wherein said guidance control system further comprises a data transceiver, said guidance control system being adapted to received digital information providing said desired trench profile via said data transceiver.

42. The trenching machine of claim 31, wherein said guidance control system is adapted to automatically maintain said digging implement positioned in accordance with said desire trench profile.

* * * * *